(12) United States Patent
Munier et al.

(10) Patent No.: US 12,317,096 B2
(45) Date of Patent: May 27, 2025

(54) DYNAMIC RELOCATION OF NODES IN A CELLULAR NETWORK

(71) Applicant: TELEFONAKTIEBOLAGET LM ERICSSON (PUBL), Stockholm (SE)

(72) Inventors: Florent Munier, Västra Frölunda (SE); Peter Hammarberg, Mölndal (SE); Yazid Lyazidi, Hässelby (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 17/912,462

(22) PCT Filed: Mar. 19, 2021

(86) PCT No.: PCT/IB2021/052329
§ 371 (c)(1),
(2) Date: Sep. 16, 2022

(87) PCT Pub. No.: WO2021/186413
PCT Pub. Date: Sep. 23, 2021

(65) Prior Publication Data
US 2023/0171608 A1 Jun. 1, 2023

Related U.S. Application Data

(60) Provisional application No. 62/992,657, filed on Mar. 20, 2020.

(51) Int. Cl.
*H04W 16/18* (2009.01)
*H04W 64/00* (2009.01)

(52) U.S. Cl.
CPC ......... *H04W 16/18* (2013.01); *H04W 64/003* (2013.01)

(58) Field of Classification Search
CPC ........................... H04W 16/18; H04W 64/003
See application file for complete search history.

(56) References Cited

U.S. PATENT DOCUMENTS

| | | | |
|---|---|---|---|
| 9,131,529 B1 | 9/2015 | Ayyagari et al. | |
| 10,021,521 B1* | 7/2018 | Reeves | H04W 36/0072 |
| 2019/0230475 A1 | 7/2019 | Edge et al. | |
| 2019/0268796 A1* | 8/2019 | Hassan | H04W 28/0226 |

FOREIGN PATENT DOCUMENTS

| | | | |
|---|---|---|---|
| JP | 2013516919 A | * | 5/2013 |
| WO | 2019086098 A1 | | 5/2019 |

OTHER PUBLICATIONS

International Search Report for PCT/IB2021/052329, mailing date of Jun. 21, 2022, 4 pages.

* cited by examiner

*Primary Examiner* — Samina F Choudhry
(74) *Attorney, Agent, or Firm* — Ericsson Inc.

(57) ABSTRACT

Systems and methods for relocating network nodes are provided herein. A network node can determine that relocation of at least one access node in the access network is required. An access node, such an IAB node with mobile capabilities, can be selected to be relocated from a first position to a second position. Relocation messages and parameters can be signaled between the network and the access node.

26 Claims, 12 Drawing Sheets

DYNAMIC RELOCATION OF NODES IN A CELLULAR NETWORK

CROSS REFERENCE TO RELATED APPLICATIONS

This application claims the benefit of U.S. Provisional Application No. 62/992,657 filed on Mar. 20, 2020, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Positioning and location services have been topics in LTE standardization since 3GPP Release 9. An objective was to fulfill regulatory requirements for emergency call positioning. Positioning in NR is proposed to be supported by the example architecture shown in FIG. 1. LMF 130A represents the location management function entity in NR. There are also interactions between the LMF 130A and the gNodeB 120 via the NRPPa protocol. The interactions between the gNodeB 120 and the device (UE) 110 are supported via the Radio Resource Control (RRC) protocol. Other network nodes, such as Access and Mobility Management Function (AMF) 130B and evolved Serving Mobile Location Center (e-SMLC) 130C, may be involved in positioning support.

Note 1: The gNB 120B and ng-eNB 120A may not always both be present.

Note 2: When both the gNB and ng-eNB are present, the NG-C interface is only present for one of them.

In the legacy LTE standards, the following techniques are supported:
  Enhanced Cell ID. Essentially cell ID information to associate the device to the serving area of a serving cell, and then additional information to determine a finer granularity position.
  Assisted GNSS. GNSS information retrieved by the device, supported by assistance information provided to the device from E-SMLC 130C
  OTDOA (Observed Time Difference of Arrival). The device estimates the time difference of reference signals from different base stations and sends to the E-SMLC 130C for multi-lateration.
  UTDOA (Uplink TDOA). The device is requested to transmit a specific waveform that is detected by multiple location measurement units (e.g. an eNB) at known positions. These measurements are forwarded to E-SMLC 130C for multi-lateration.

The NR positioning for Release 16, based on the 3GPP NR radio-technology, is positioned to provide added value in terms of enhanced location capabilities. The operation in low and high frequency bands (i.e. below and above 6 GHz) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA and UTDOA, Cell-ID or E-Cell-ID etc., utilizing timing measurements to locate a UE.

Integrated Access and Backhaul (IAB) strives to reuse existing functions and interfaces defined for access. In particular, the Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB are possible. FIG. 2 illustrates an example IAB architecture.

The Mobile-Termination (MT) function has been defined as a component of the Mobile Equipment. In the context of the present disclosure, MT is referred to as a function residing on an IAB-node 150 that terminates the radio interface layers of the backhaul Uu interface toward the IAB-donor 152 or other IAB-nodes.

IAB solutions can be used for network coverage extension. An IAB donor node 152 provides backhaul connectivity to an IAB child node 150 which, in turn, provides access to the UE(s) 110 connected to it. The connection can be used for data communication as well as for positioning purposes.

When an IAB child node 150 is strategically placed such that the channel conditions between an IAB child node 150 and an IAB donor node 152, and the IAB child node 150 and the UEs 110 being served are more favorable than the channel conditions between the IAB donor 152 and the UEs 110, IAB solutions enable coverage extension which can be beneficial for both communication and positioning. Therefore, IAB can play an important role in scenarios where the network capabilities need to be extended or improved. To extend the network coverage using the IAB solutions, an IAB child node 150 can potentially be carried by a vehicle or an aerial, e.g. a drone, making the IAB child node 150 portable or mobile.

In some architectures, the IAB donor node 152 hosts the central unit (CU) functionality while the IAB child node 150 hosts the distributed unit (DU) functionality, without the CU functionality as shown in FIG. 2. The IAB child node 150 with the DU is responsible for providing wireless access to the UEs 110 and hosts the PHY, MAC and the RLC layers. While the IAB donor node 152 with the CU is responsible for PDCP protocol and RRC. The Mobile Termination (MT) provides the physical interface for the backhaul link between the IAB child node 150 and IAB donor node 152.

In conventional networks, the position of the network nodes (e.g. access nodes, eNB, gNB, etc.) are assumed static except for the mobile user equipment (UE).

SUMMARY

It is an object of the present disclosure to obviate or mitigate at least one disadvantage of the prior art.

There are provided systems and methods for relocating a network node.

In a first aspect there is a method performed by a network node. The network node can comprise a radio interface and processing circuitry and be configured to communicate with access nodes via an access network. The network node determines that relocation of at least one access node in the access network is required. A first access node is selected to be relocated from a first position to a second position in accordance with relocation capability information associated with the first access node. The network node transmits, to the first access node, a relocation request message including parameters related to the relocation from the first position to the second position. A relocation success message is received from the first access node.

In some embodiments, determining that relocation of the at least one access node is required can be responsive to identifying if sufficient positioning accuracy is obtained from a current network topology. In some embodiments, determining that relocation of the at least one access node is required can be responsive to receiving a request from the first access node to relocate.

In some embodiments, the network node computes the second position for the access node.

In some embodiments, the parameters related to the relocation can include at least one of: coordinates for the second position, relative distance to move in a specified direction, and a requested time duration for node availability at the second position.

In some embodiments, the network node can receive a relocation acknowledgement message from the first access node. The relocation acknowledgement message can include an indication of if the first access node will relocate or not. The relocation acknowledgement message can include a modification to the requested relocation position.

In some embodiments, the relocation success message can include an indication of a current position of the first access node.

In some embodiments, the network node can receive an indication to suspend use of the first access node for positioning purposes pending a relocation.

In some embodiments, responsive to receiving the relocation success message, the network node can request positioning support from the first access node.

In another aspect there is provide a method performed by an access node. The access node can comprise a radio interface and processing circuitry and be configured to communicate with a network node via an access network. The access node receives, from the network node, a relocation request message including parameters related to relocating the access node from a first position to a second position. The access node determines if it is capable of relocating to the second position. The access node performs the relocation; and a relocation success message is transmitted to the network node.

In some embodiments, the access node can transmit a request to the network node to relocate.

In some embodiments, the parameters related to the relocation can include at least one of: coordinates for the second position, relative distance to move in a specified direction, and a requested time duration for node availability at the second position.

In some embodiments, responsive to determining if the access node is capable of relocating to the second position, the access node transmits a relocation acknowledgement message including an indication of if the access node will relocate or not. The relocation acknowledgement message includes a modification to the requested relocation position.

In some embodiments, the access node can transmit an indication to suspend use of the access node for positioning purposes pending a relocation.

In some embodiments, the relocation success message can include an indication of a current position of the first access node.

In some embodiments, responsive to transmitting the relocation success message, the access node can perform a positioning action.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
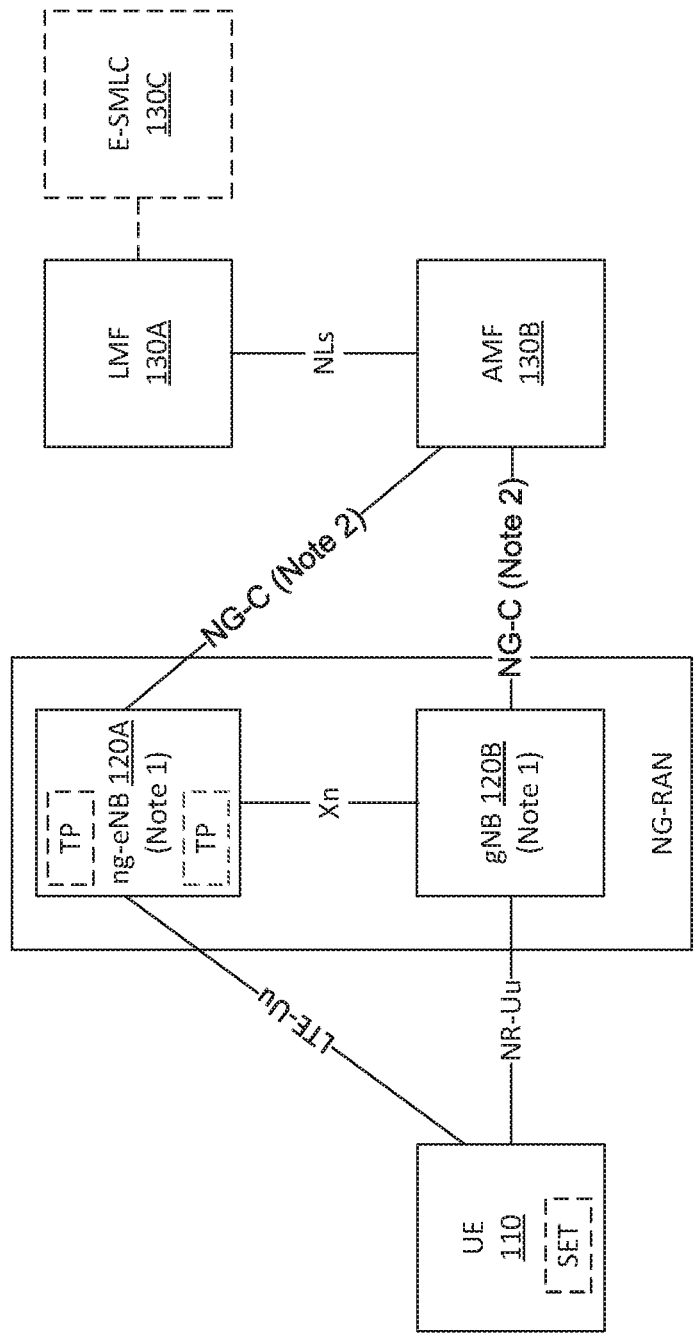
FIG. 1 illustrates an example of NR positioning architecture.
Figure 2:
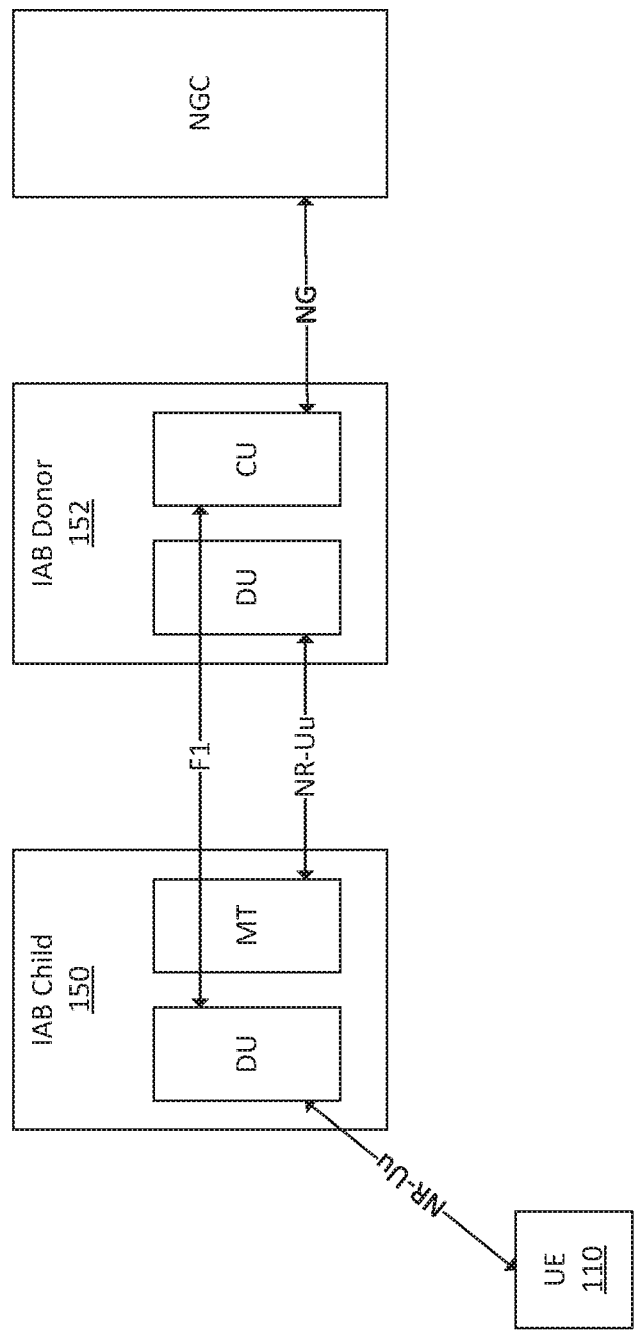
FIG. 2 illustrates an example IAB architecture.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 10.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G NR concepts, beams may be used instead of cells and, as such, it is important to note that the concepts described herein are equally applicable to both cells and beams.

Figure 3A:
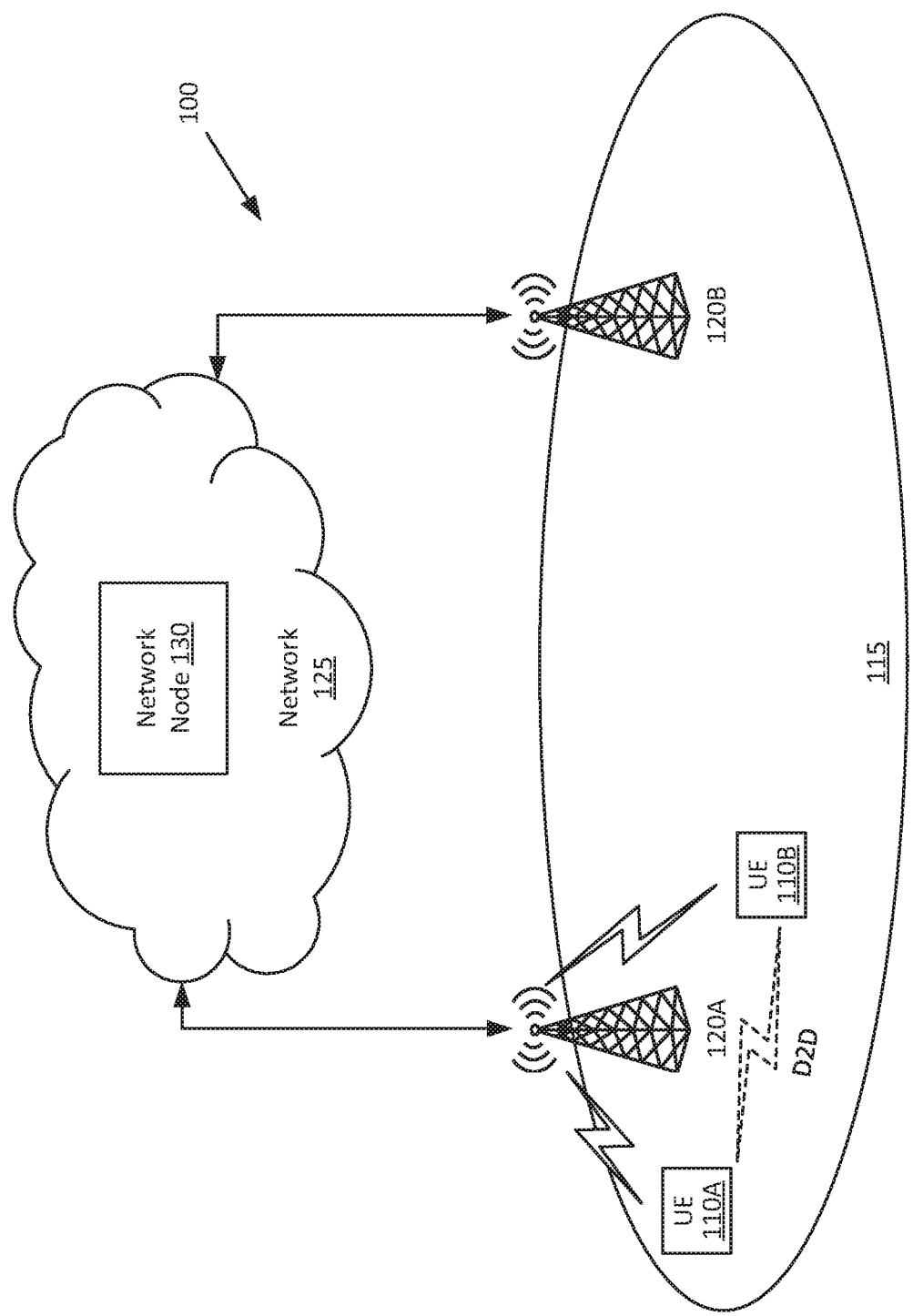
FIG. 3a illustrates an example wireless network.

FIG. 3*a* illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 3B:
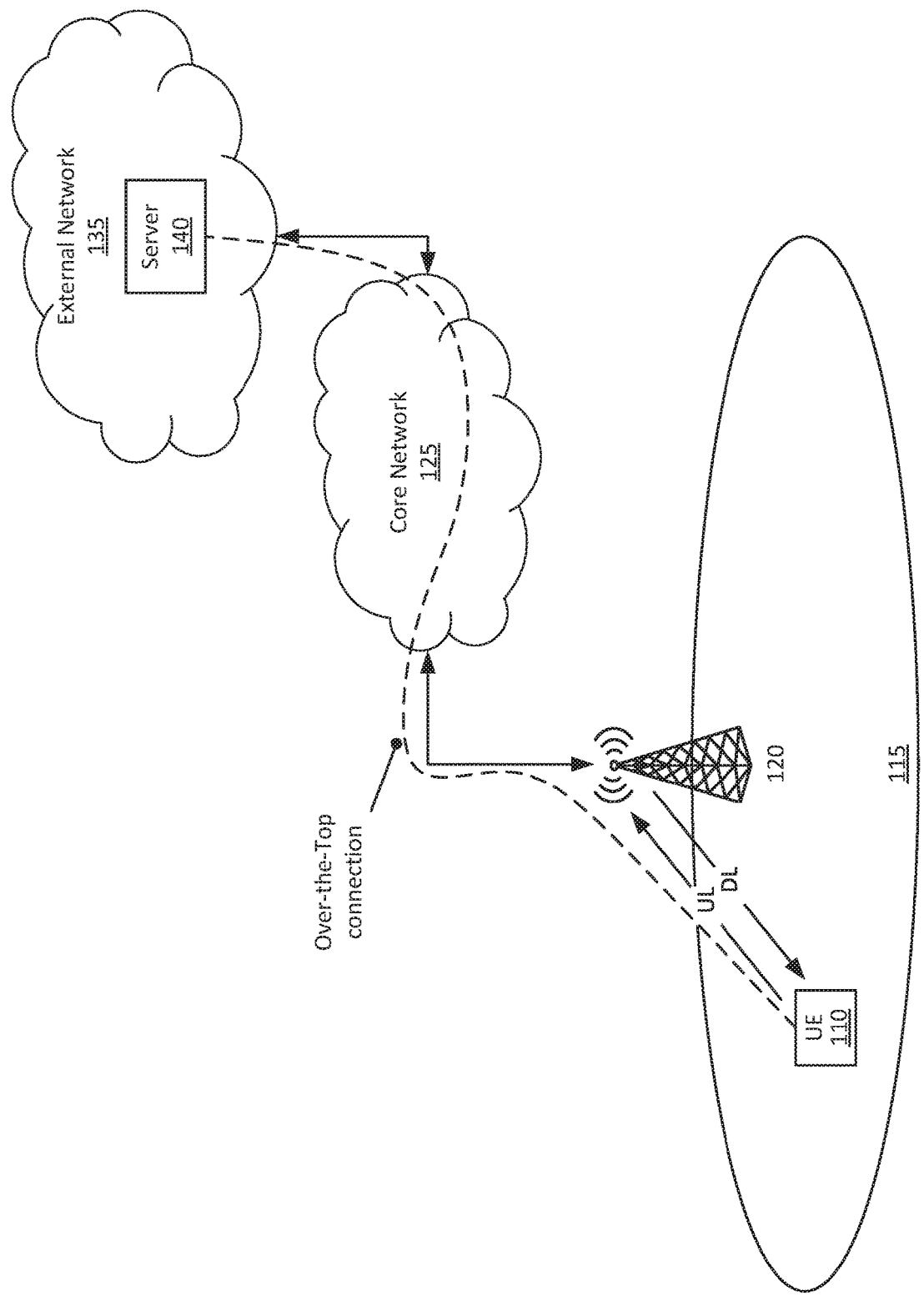
FIG. 3b illustrates an example of signaling in a wireless network.

FIG. 3b illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

As previously discussed, in conventional networks, except for UEs, the position(s) of the network nodes are assumed to be static. This can be a correct assumption when the network cell is transmitting from the top of a tower or mast. However, with the advent of IAB network nodes, the possibility to dynamically relocate a node has emerged.

Some embodiments described herein include mechanisms for the network management (which can be the LMF) to request, or order, relocation of a network node. An example application is for the purpose of positioning a UE, but the procedure could be executed for multiple purposes, such as coverage management.

According to some embodiments, the system under consideration includes a core network connected to one or several network nodes. The nodes can be radio nodes such as base stations or user terminals. The nodes are assumed to be able to estimate their own position(s), also referred to as "ego position", with or without help from the network. The connection to the nodes may be through a wired connection, or a terrestrial or non-terrestrial wireless connection (e.g. NR IAB or a satellite link). A node controlling unit (NCU) is located somewhere in the network. The NCU is capable of computing a suitable location for a node based on the appropriate information. The NCU can be represented by the NR location management function (LMF), or by a separate network entity interworking with the LMF. For illustrative purposes, the embodiments described herein will assume the NCU is represented by the LMF. Typically, the LMF will be implemented in the core network, but an implementation with the LMF in another one of the nodes is also possible (e.g. the "LMFd", which is an LMF distributed in the node).

Figure 4:
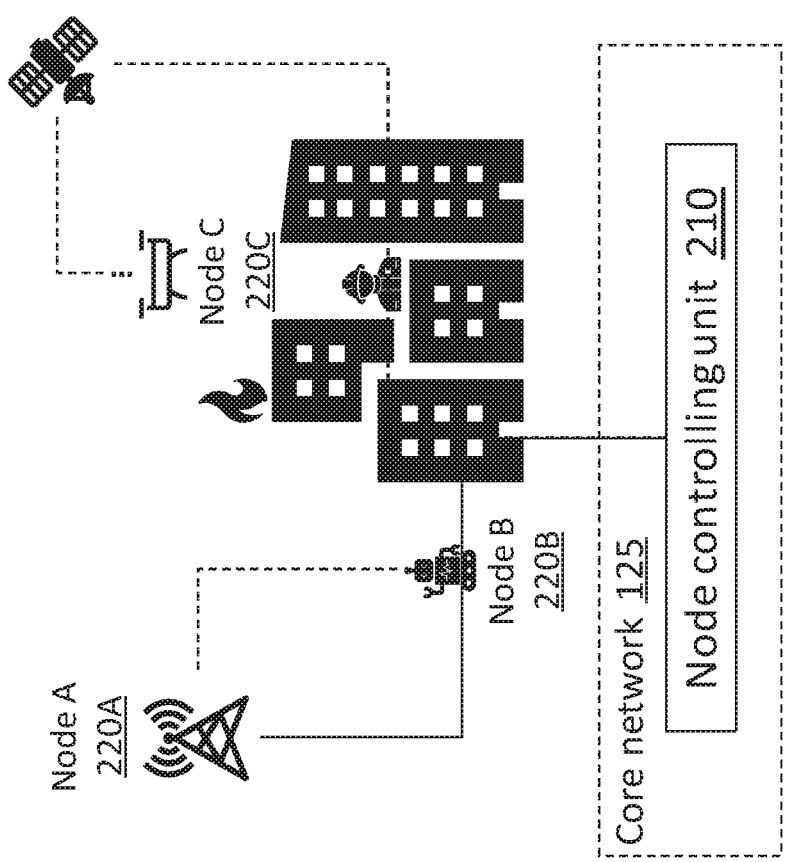
FIG. 4 is an example system overview.

An example system, with the NCU 210 located in the core network 125, is illustrated in FIG. 4. Examples access nodes in the network can include fixed access node (e.g. gNB) 220A and different types of mobile access nodes 220B and 220C.

In some embodiments, the LMF can transmit a message to a network node with a request for relocation. The request may include, but not be limited to, coordinates for the new location, and requested time duration for the node availability (relevant e.g. for a battery powered node). The purpose of the relocation procedure is to allow the location management function (LMF) to provide a location for each node in the positioning event, which is considered optimal by the LMF. The relocation procedure can be initiated by the LMF.

However, the node can have control over its potential relocation and may deny the request.

A relocation message can be given in absolute coordinates for a new position or as a relative relocation request such as request to move a specific distance in a specified direction, for example. Also, the request may include a six-dimensional (6D) relocation, i.e., both a request for new position of the node and a request for new orientation of the node. The coordinates can also be made to represent an area of interest, for example, through additional parameters such as radius of the area.

In some embodiments, upon reception of the relocation request message, the network node can perform the relocation to the specified coordinate or area of interest.

In some embodiments, a node's ability to relocate is a node capability known by the LMF through (pre-)configuration or message exchange.

In some embodiments, the node can optionally (or never, or always, or based on pre-configuration) reply with a relocation acknowledge message, stating if the node will relocate or not, and potentially including a reason for not relocating. A number of alternative reasons can be specified in a table known by both the network and the node, such that only the index of the table is transmitted. For example, the node might be fixed, such as mounted on a tower or building or attached to a cable of limited length. Alternatively, this ability of movement of a node can be known in advance by the network by pre-configuration or capability signaling. Also, the node may have a position where the movement to the new position is impossible due to other physical objects such as buildings, trees, weather conditions, etc. Yet another possibility for not relocation can be a lack of (or poor) coverage in the new position. Additionally, the energy stored in a battery or in other fuel type may not be sufficient to reach the new location. Additionally, the relocating node may have been requested by another node controlling unit to move to another area of interest or coordinates with a higher relocation priority and will respond to the LMF with a failure or negative acknowledgement message.

In some embodiments, after the optional acknowledgment of relocation, the node will transmit a message indicating the success of the relocation. The message may include, but not be limited to, the new coordinates of the node, and estimated accuracy of the ego position.

In some embodiments, the relocation success message can include a reason for not relocating exactly to the requested position. This message can have the same features as described above for the "relocation acknowledgement message". The LMF can take appropriate action based on the failure reason indicated, such as setting up a new area of interest or coordinates for the node's relocation.

In one embodiment, upon sending the relocation success message, the network node can perform the requested positioning action for the UE in the new area of interest.

Figure 5:
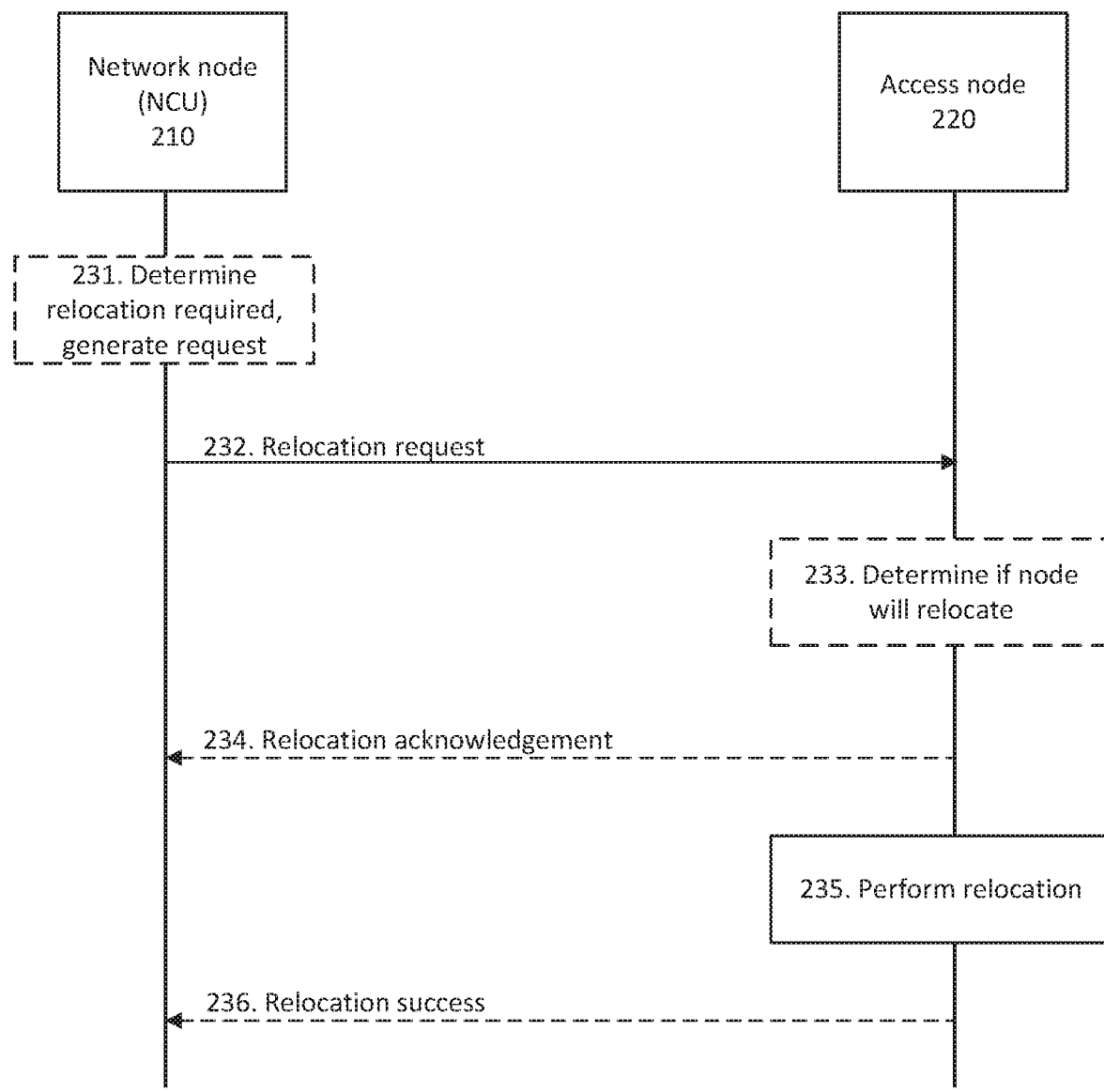
FIG. 5 is a signaling diagram illustrating an NCU-initiated relocation.

FIG. 5 is a signaling diagram illustrating an example of NCU-initiated relocation. The NCU 210 can determine that access node 220 should be relocated and/or generate a relocation request message (step 231). NCU 210 transmits the relocation request to access node 220 (step 232). Access node 220 determines if it will relocate in accordance with the received request (step 233) and, optionally, responds with a relocation acknowledgement message (step 234). Access node 220 can then perform the relocation (step 235) and, optionally, transmit a relocation success message to the NCU 210 (step 236).

In another embodiment, a node can transmit an indication to the LMF to inform the location services (LCS) client, e.g. in the UE, to suspend the use of the node for the purpose of positioning by the LMF, pending a relocation, potentially including target coordinates and reason for relocation. The node can inform the LMF that it has cancelled the current reporting procedure; or that it will stop reporting UE position in the area of interest; or that the node will only start reporting once it has changed its area of interest into a new one. The network can transmit an acknowledgement message, potentially including a suggested alternative/preferred area of interest for location, potentially with a priority order. After relocating, the node can transmit a relocation success message, re-enabling the use of the node by the LMF for the purpose of positioning. In some embodiments, the LMF can then update the LCS client to resume the use of the node for positioning.

Figure 6:
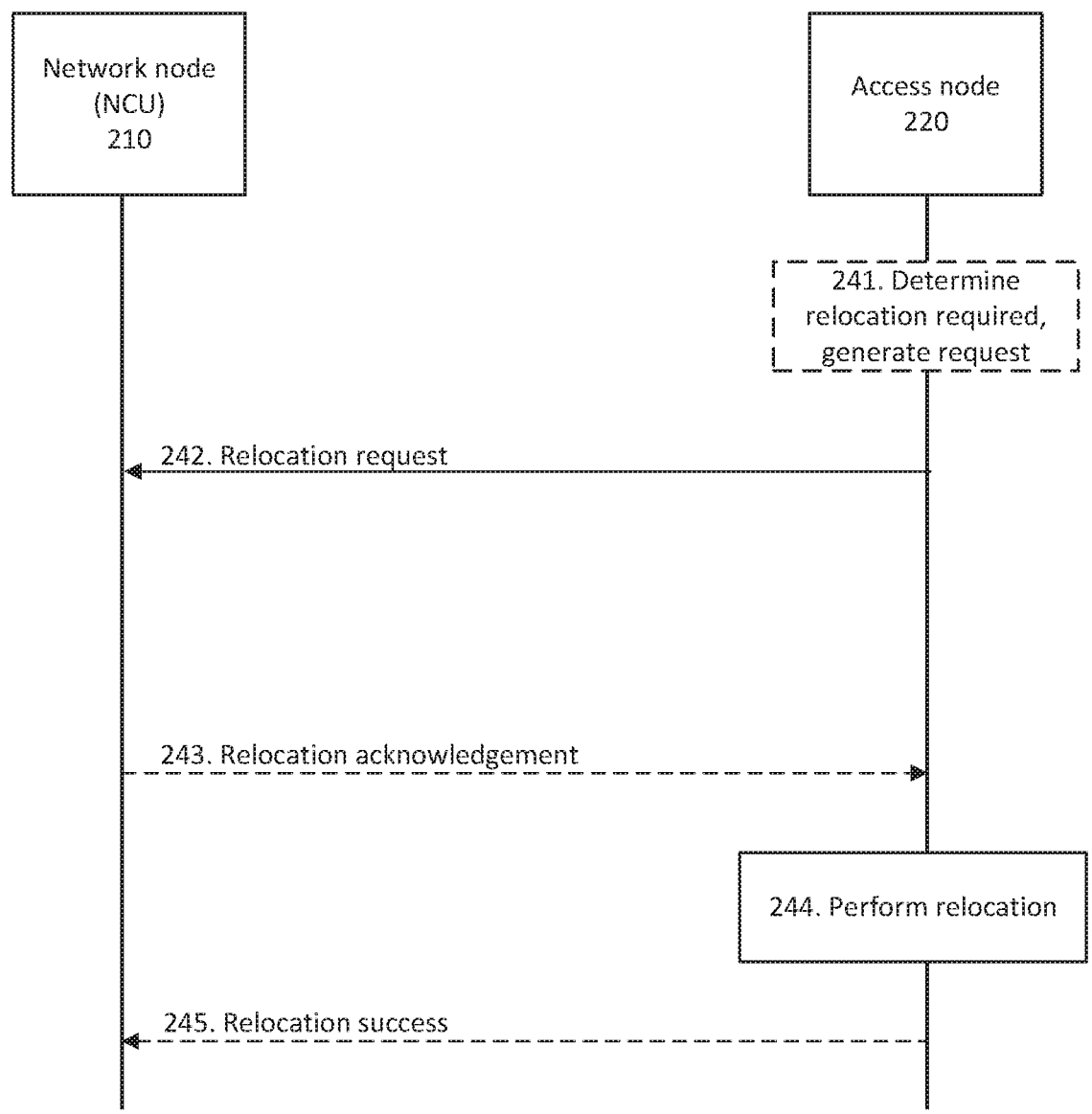
FIG. 6 is a signaling diagram illustrating a node-initiated relocation.

FIG. 6 is a signaling diagram illustrating an example of node-initiated relocation. The access node 220 can determine if it should be relocated and/or generate a relocation request message (step 241). Access node 220 transmits the relocation request to NCU 210 (step 242). Optionally, NCU 210 can respond with a relocation acknowledgement message (step 243). In some embodiments, the relocation acknowledgement message can include positioning and/or re-positioning information for the access node 220. Access node 220 can then perform the relocation (step 244) and, optionally, transmit a relocation success message to the NCU 210 (step 245).

It will be appreciated that some of the relocation-related messages described herein (e.g. request, acknowledgement, success, etc.) could be mandated as part of the procedure in some implementations (i.e. not configurable), while in other implementations they can be configurable through signaling.

Accordingly, the embodiments described herein allow for the network protocol (e.g. the NR positioning protocol, NRPPa) to be used to relocate a network node, already registered in the LMF by OAM, and use that node (e.g. together with other nodes) to compute a UE position with an improved accuracy. A desired target area location can be signaled from one network entity (e.g. location server) toward another network element (e.g. radio access node), with acknowledgement from the network element containing a location update when required.

Figure 7:
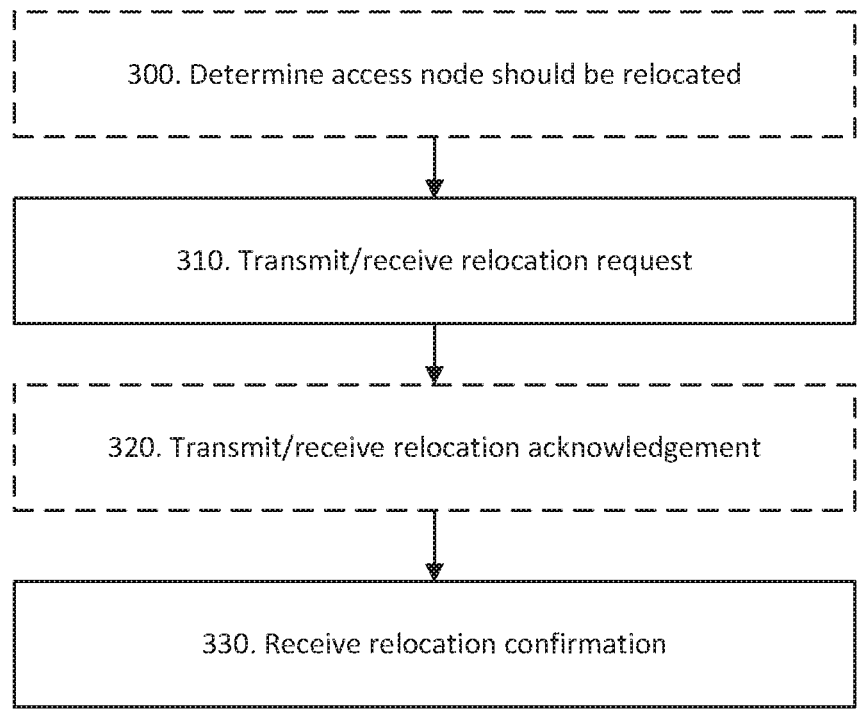
FIG. 7 is a flow chart illustrating a method which can be performed in a network node.

FIG. 7 is a flow chart illustrating a method which can be performed in a network node, such as a core network node (e.g. LMF) and/or NCU 210 as described herein. The method can include:

Step 300: Optionally, the network node can determine if one or more access nodes should be relocated. In some embodiments, the network node stores or obtains relocation capability information associated with one or more access node(s) in the network. An access node to be relocated can be selected in accordance with its associated relocation capability information.

Step 310: Transmitting or receiving a relocation request. In some embodiments, the network node can generate a relocation request message and transmit it to the associated access node. In other embodiments, the network node can receive a relocation request message from an access node. In some embodiments, the network node can compute a new position for the access node. The relocation message can include parameters related to the relocation of the access node from a first position to a second position such as coordinates and/or time.

Step 320: Transmitting or receiving a relocation acknowledgement. In some embodiments, the network node can optionally generate a relocation acknowledgement message (e.g. in response to receiving a relocation request) and transmit it to the associated access node. In other embodiments, the network node can optionally receive a relocation acknowledgement message from the access node. The optional relocation acknowledge message can include an indication of if the access node will relocate or not. In some embodiments, the relocation acknowledgement message can include further coordinates/positioning information, such as a modification to the initially requested relocation position.

Step 330: Receiving a relocation confirmation. The network node can receive a relocation success message from the access node to confirm that the access node has completed the relocation. In some embodiments, the relocation success message can include an indication of a current position of the access node.

It will be appreciated that one or more of the above steps can be performed simultaneously and/or in a different order. Also, steps illustrated in dashed lines are optional and can be omitted in some embodiments.

Figure 8:
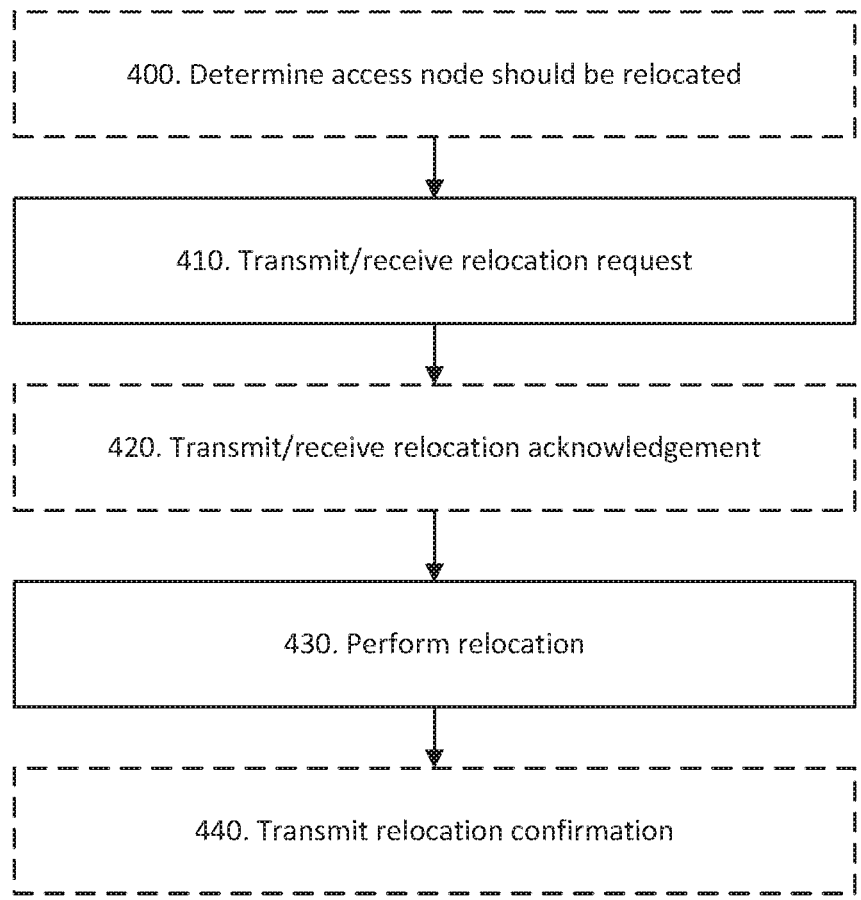
FIG. 8 is a flow chart illustrating a method which can be performed in an access node.

FIG. 8 is a flow chart illustrating a method which can be performed in an access node, such as a mobile radio access node and/or IAB node as described herein. The method can include:

Step 400: Optionally, the access node can determine if it should be relocated. In some embodiments, the access node can determine that it should be relocated to another position. In other embodiments, the access node can determine if it should, or should not, be relocated to another position in response to a relocation request or instruction.

Step 410: Transmitting or receiving a relocation request. In some embodiments, the access node can generate a relocation request message and transmit it to a network node. In other embodiments, the access node can receive a relocation request message from the network node. The relocation message can include parameters related to the relocation of the access node from a first position to a second position such as coordinates and/or time.

Step 420: Transmitting or receiving a relocation acknowledgement. In some embodiments, the access node can optionally generate a relocation acknowledgement message (e.g. in response to receiving a relocation request) and transmit it to the network node. In other embodiments, the access node can optionally receive a relocation acknowledgement message from the network node. The optional relocation acknowledgement message can include an indication of if the access node will relocate or not. In some embodiments, a relocation acknowledgement message can be transmitted in response to determining if the access node is capable to relocating to the requested second position. In some embodiments, the relocation acknowledgement message can include further coordinates/positioning information, such as a modification to the initially requested relocation position.

Step 430: Performing the relocation. The access node can relocate from a first position to a second position in accordance with the appropriate relocation message(s) and parameter(s).

Step 440: Transmitting a relocation confirmation. The access node can transmit a relocation success message to the network node to confirm that the access node has completed the relocation. In some embodiments, the relocation success message can include an indication of the current position of the access node.

It will be appreciated that one or more of the above steps can be performed simultaneously and/or in a different order. Also, steps illustrated in dashed lines are optional and can be omitted in some embodiments.

Figure 9:
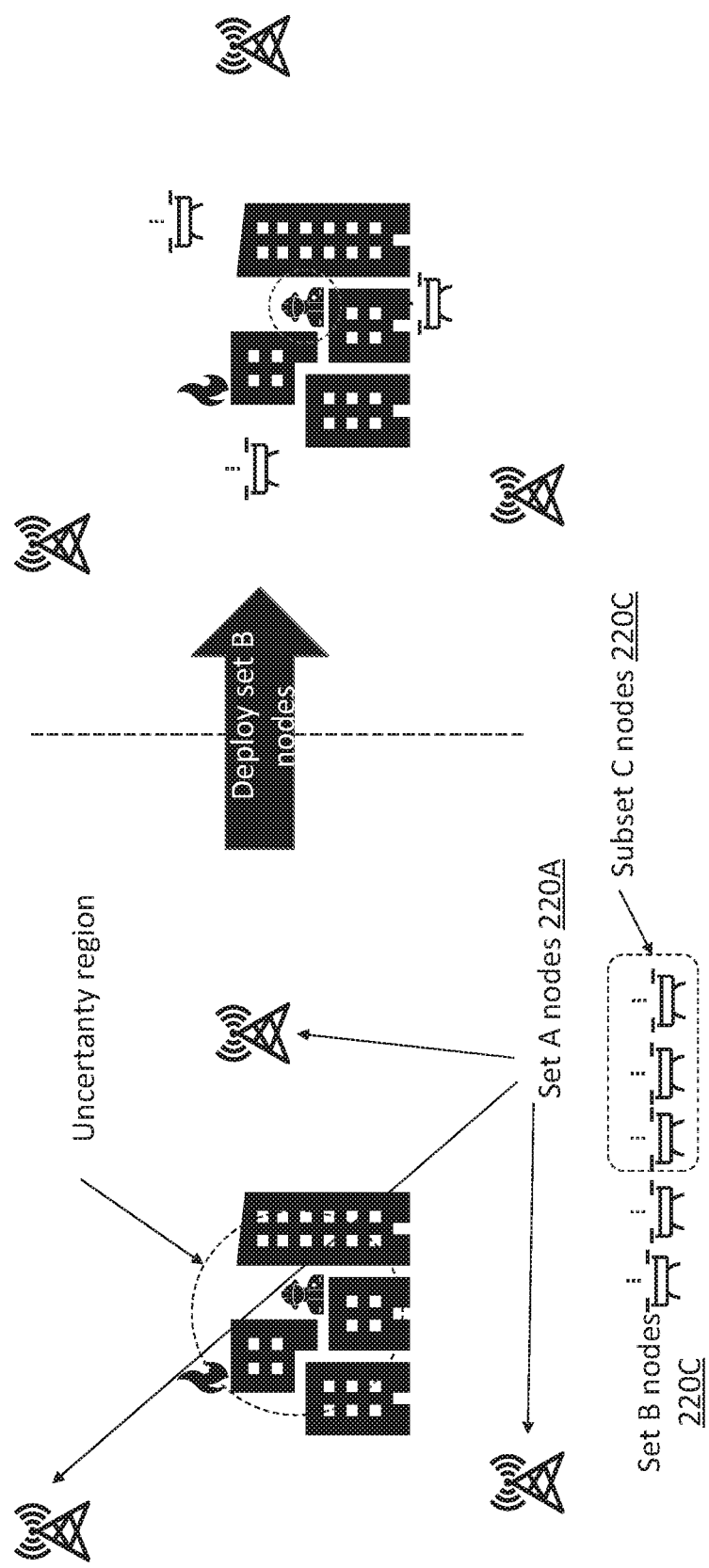
FIG. 9 is an example use case.

FIG. 9 illustrates a first example use case for some embodiments described herein. One potential scenario could be locating an emergency caller or to enhance positioning of first responders or equipment. This procedure could also be used to more accurately locate a shipment/goods in a logistics scenario. It could also be used to enhance positioning during (e.g. temporary) remote controlling of an autonomous vehicle.

Network setup: Consider two sets of network nodes: a set A of conventional, fixed base stations 220A and a set B of mobile (e.g. IAB) base stations 220C. In some embodiments, the set B nodes could be included in drones or another form of autonomous or remote-controlled mobile devices.

Example Procedure:
1. Identify position of UE using the set A node(s) (and any other means).
2. Identify if sufficient positioning accuracy is obtained.
3. Request additional positioning support from set B node(s).
4. Network can determine a subset C of the set B nodes to use and determine their positions based on, e.g., positioning requirements, availability, UE identified approximate position, set A node positions etc.
5. The subset C nodes travel to their selected positions and measure their exact position, potentially using set A nodes and the other C nodes.
6. The subset C nodes report their position (e.g. as part of LPP protocol).
7. The network reallocates positioning resources (e.g. PRS configuration) in accordance with the new network topology.
8. The network (re)configures the UE with the new configuration.
9. The UE measures and reports on the new set of resources.
10. The network calculates the new position.

Figure 10:
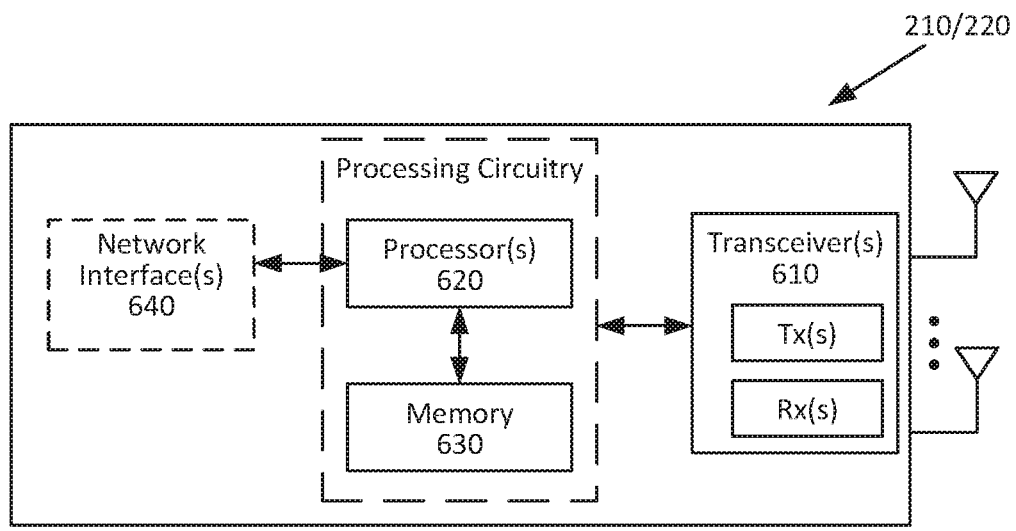
FIG. 10 is a block diagram of an example network node.

FIG. 10 is a block diagram of an exemplary network node 210/220. The exemplary node can be a network node 210 (e.g. NCU, LMF) or an access node 220 (e.g. gNB, IAB node), in accordance with certain embodiments. Network node 210/220 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by network node 210/200, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 210/220, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 210/220, send output from node 210/220, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 210/220 can include additional components beyond those shown in FIG. 10 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 10 may be included in other network nodes (such as UE 110, core network node 130, etc.). Other network nodes may optionally include or not include a wireless interface (such as the transceiver described in FIG. 10).

Figure 11:
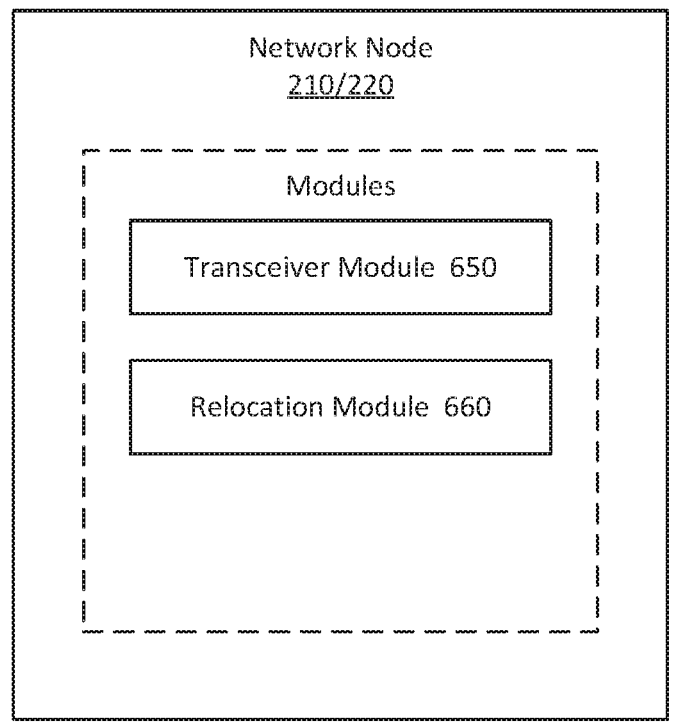
FIG. 11 is a block diagram of an example network node with modules.

In some embodiments, the network node 210/220, may comprise a series of modules configured to implement the functionalities of the network node described above. Referring to FIG. 11, in some embodiments, the network node 210/220 can comprise a transceiver module 650 for receiving and receiving relocation related messages, such as relocation requests, acknowledgements and confirmations, and a relocation module 660 for determining if a node should relocate and/or performing a relocation procedure.

It will be appreciated that the various modules may be implemented as combination of hardware and software, for instance, the processor, memory and transceiver(s) of network node 210/220 shown in FIG. 10. Some embodiments may also include additional modules to support additional and/or optional functionalities.

Figure 12:
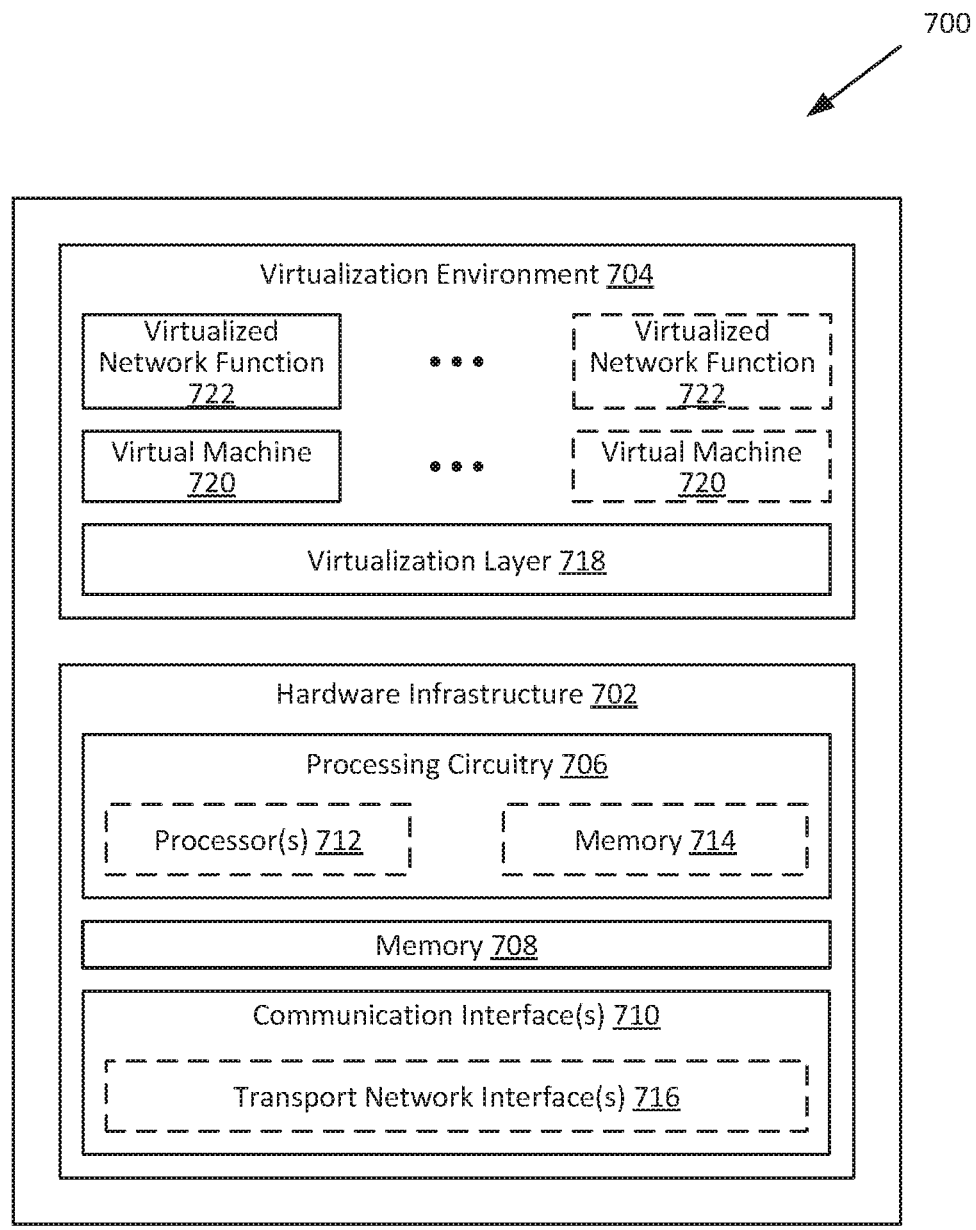
FIG. 12 is a block diagram of an example virtualized processing node.

Turning now to FIG. 12, some network nodes (e.g. UEs 110, radio access nodes 120, core network nodes 130, NCU 210, IAB node 220, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

3GPP Third Generation Partnership Project
ACK Acknowledgement
AP Access point
ARQ Automatic Repeat Request
BS Base Station
BSC Base station controller
BSR Buffer Status Report
BTS Base transceiver station
CA Carrier Aggregation
CC Component carrier
CCCH SDU Common Control Channel SDU
CG Configured Grant
CGI Cell Global Identifier
CN Core network
CQI Channel Quality information
CSI Channel State Information
CU Central Unit
DAS Distributed antenna system
DC Dual connectivity
DCCH Dedicated Control Channel
DCI Downlink Control Information
DL Downlink
DMRS Demodulation Reference Signal
DU Distributed Unit
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LCH Logical channel
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network SR Scheduling Request
SRS Sounding Reference Signal
SSC Secondary Serving Cell
TB Transport Block
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a network node that is configured to communicate with access nodes via an access network, the method comprising:
   determining that relocation of at least one access node in the access network is required in response to receiving a request from a first access node to relocate;
   selecting the first access node to be relocated from a first position to a second position in accordance with relocation capability information associated with the first access node;
   transmitting, to the first access node, a relocation request message including parameters related to the relocation from the first position to the second position; and
   receiving a relocation success message from the first access node.

2. The method of claim 1, wherein determining that relocation of the at least one access node is required is responsive to identifying if sufficient positioning accuracy is obtained from a current network topology.

3. The method of claim 1, further comprising, computing the second position for the access node.

4. The method of claim 1, wherein the parameters related to the relocation include at least one of: coordinates for the second position, relative distance to move in a specified direction, and a requested time duration for node availability at the second position.

5. The method of claim 1, further comprising, receiving a relocation acknowledgement message from the first access node, the relocation acknowledgement message including an indication of if the first access node will relocate or not.

6. The method of claim 1, further comprising, receiving a relocation acknowledgement message from the first access node, the relocation acknowledgement message including a modification to the requested relocation position.

7. The method of claim 1, wherein the relocation success message includes an indication of a current position of the first access node.

8. The method of claim 1, further comprising, receiving an indication to suspend use of the first access node for positioning purposes pending a relocation.

9. The method of claim 1, further comprising, responsive to receiving the relocation success message, requesting positioning support from the first access node.

10. A network node comprising: a radio interface; and processing circuitry configured to:
    determine that relocation of at least one access node in the access network is required in response to receiving a request from a first access node to relocate;
    select the first access node to be relocated from a first position to a second position in accordance with relocation capability information associated with the first access node;
    transmit, to the first access node, a relocation request message including parameters related to the relocation from the first position to the second position; and
    receive a relocation success message from the first access node.

11. The network node of claim 10, wherein determining that relocation of the at least one access node is required is responsive to identifying if sufficient positioning accuracy is obtained from a current network topology.

12. The network node of claim 10, further configured to compute the second position for the access node.

13. The network node of claim 10, wherein the parameters related to the relocation include at least one of: coordinates for the second position, relative distance to move in a specified direction, and a requested time duration for node availability at the second position.

14. The network node of claim 10, further configured to receive a relocation acknowledgement message from the first access node, the relocation acknowledgement message including an indication of if the first access node will relocate or not.

15. The network node of claim 10, further configured to receive a relocation acknowledgement message from the first access node, the relocation acknowledgement message including a modification to the requested relocation position.

16. The network node of claim 10, wherein the relocation success message includes an indication of a current position of the first access node.

17. The network node of claim 10, further configured to receive an indication to suspend use of the first access node for positioning purposes pending a relocation.

18. The network node of claim 10, further configured to, responsive to receiving the relocation success message, request positioning support from the first access node.

19. A method performed by an access node that is configured to communicate with a network node via an access network, the method comprising:
    transmitting a request to the network node to relocate;
    receiving, from the network node, a relocation request message including parameters related to relocating the access node from a first position to a second position;
    determining if the access node is capable of relocating to the second position;
    performing the relocation; and
    transmitting a relocation success message to the network node.

20. The method of claim 19, wherein the parameters related to the relocation include at least one of: coordinates for the second position, relative distance to move in a specified direction, and a requested time duration for node availability at the second position.

21. The method of claim 19, further comprising, responsive to determining if the access node is capable of relocating to the second position, transmitting a relocation acknowledgement message including an indication of if the access node will relocate or not.

22. The method of claim 21, wherein the relocation acknowledgement message includes a modification to the requested relocation position.

23. The method of claim 19, further comprising, transmitting an indication to suspend use of the access node for positioning purposes pending a relocation.

24. The method of claim 19, wherein the relocation success message includes an indication of a current position of the first access node.

25. The method of claim 19, further comprising, responsive to transmitting the relocation success message, performing a positioning action.

26. An access node comprising; a radio interface; and processing circuitry configured to:
 transmit a request to a network node to relocate;
 receive, from the network node, a relocation request message including parameters related to relocating the access node from a first position to a second position;
 determine if the access node is capable of relocating to the second position;
 perform the relocation; and
 transmit a relocation success message to the network node.

* * * * *